US007302486B1

(12) United States Patent
Pai

(10) Patent No.: US 7,302,486 B1
(45) Date of Patent: Nov. 27, 2007

(54) EFFICIENT RETRIEVAL OF DESIRED INFORMATION FROM AGENTS

(76) Inventor: Nalinaksh Madhukar Pai, B/9, Gagan Vihar Co-op Society, Ashok Chakravarty Complex, Opp. Sahar Cargo Estate, Andheri East Mumbai (IN) 400 099

(*) Notice: Subject to any disclaimer, the term of this patent is extended or adjusted under 35 U.S.C. 154(b) by 886 days.

(21) Appl. No.: 10/171,618

(22) Filed: Jun. 17, 2002

(51) Int. Cl.
G06F 115/06 (2006.01)
(52) U.S. Cl. .................. 709/228; 709/202; 709/217; 709/229
(58) Field of Classification Search ............... 709/227, 709/228, 331, 229, 202, 217
See application file for complete search history.

(56) References Cited

U.S. PATENT DOCUMENTS

2002/0161935 A1* 10/2002 Blaisdell ................ 709/331

OTHER PUBLICATIONS

RFC 1905, J. Case et al, Protocol operations for version 2 of the simple network management protocol (SNMPv2), Jan. 1996.*

A concept for hierarchical, decentralized management of the physical configuration in the Internet, H. Nikolaus Schaller, 1995.*
SNMPv2 Working Group; Entitled: "Request for Comments: 1905-Protocol Operations for Version 2 of the Simple Network Management Protocol (SNMPv2)";Jan. 1996; Available from http://www.letf.org/rfc/rfc1905.txt; (24 pages).
Entitled:"Cisco Bulk-File MIB: Bulk file creation MIB"; Aug. 1997, Bob Stewart, Jun. 2001, Thai Dang, Aug. 2001 A S Kiran Koushik; Available from ftp://ftp.cisco.com/pub/mibs/v2/CISCO-BULK-FILE-MIB.my; (16 pages).
McCloghrie, et al.;Entitled:"Request for Comments 2579- Textual Conventions for SMIv2";Apr. 1999;Available from http://www.ietf.org/rfc/rfc2579.txt; (22 pages).

* cited by examiner

Primary Examiner—Ario Etienne
Assistant Examiner—Djenane M. Bayard
(74) Attorney, Agent, or Firm—Narendra Reddy Thappeta

(57) ABSTRACT

A meta MIB may be implemented in an agent, which enables a network management station (NMS) to specify various information elements of interest in potentially multiple MIBs. The NMS may further specify the specific instances (rows) of interest in the information elements. The information of interest may then be retrieved using potentially a single get command. The received information may further contain a sparse index indicating the invalid entries in the received data such than an NMS can easily parse the received data.

83 Claims, 9 Drawing Sheets

| | |
|---|---|
| 401 | /* Create a row in cdcConfObjectTable with index 1, put the row in a temporary |
| 402 | state, until activated */ |
| 403 | set { cdcConfObjectRowStatus.1 = createAndWait } |
| 404 | |
| 405 | /* Specify the first object to be fetched as ifInOctets */ |
| 406 | set { cdcConfObjectOid.1     = 1.3.6.1.2.1.2.2.1.10 } |
| 407 | |
| 408 | /* Set the above created row to active */ |
| 409 | set { cdcConfObjectRowStatus.1 = active } |
| 410 | |
| 411 | /* Similarly specify the remaining 3 columns. Note that a different index is used |
| 412 | to specify each column. */ |
| 413 | |
| 414 | /* ifOutOctets */ |
| 415 | set { cdcConfObjectRowStatus.2 = createAndWait } |
| 416 | set { cdcConfObjectOid.2     = 1.3.6.1.2.1.2.2.1.16 } |
| 417 | set { cdcConfObjectRowStatus.2 = active } |
| 418 | |
| 419 | /* dot3StatsLateCollisions */ |
| 420 | set { cdcConfObjectRowStatus.3 = createAndWait } |
| 421 | set { cdcConfObjectOid.3     = 1.3.6.1.2.1.10.7.2.1.8 } |
| 422 | set { cdcConfObjectRowStatus.3 = active } |
| 423 | |
| 424 | /* dot3StatsFCSErrors */ |
| 425 | set { cdcConfObjectRowStatus.4 = createAndWait } |
| 426 | set { cdcConfObjectOid.4     = 1.3.6.1.2.1.10.7.2.1.3 } |
| 427 | set { cdcConfObjectRowStatus.4 = active } |

Fig. 4A

```
440         /* Create a row in the cdcConfRowInstTable */
441             set { cdcConfRowInstRowStatus.1 = createAndWait }
442
443         /* Specify that the exact row instance specified in  cdcConfRowInstOid has to be
444         fetched */
445             set { cdcConfRowInstType.1 = 'individual' }
446
447         /* Specify the 'row instance' to be fetched, here we specify the  ifIndex value of 1
448         */
449             set { cdcConfRowInstOid.1 = 1 }
450
451         /* Set the above created row to active */
452             set { cdcConfRowInstRowStatus.1 = active }
453
454
455         /* Do the same for the remaining rows */
456
457         /* For ifIndex = 3 */
458             set { cdcConfRowInstRowStatus.2 = createAndWait }
459             set { cdcConfRowInstType.2 = 'individual' }
460             set { cdcConfRowInstOid.2 = 3 }
461             set { cdcConfRowInstRowStatus.2 = active }
462
463         /* For ifIndex = 40 to 45 */
464             set { cdcConfRowInstRowStatus.3 = createAndWait }
465             set { cdcConfRowInstType.3 = 'range' }
466             set { cdcConfRowInstOid.3 = 40 } /* start of the range */
467             set { cdcConfRowInstOidEnd.3 = 45 }   /* the end of the range */
468             set { cdcConfRowInstRowStatus.3 = active }
469
470         /* For ifIndex = 100 */
471             set { cdcConfRowInstRowStatus.4= createAndWait }
472             set { cdcConfRowInstType.4 = 'individual' }
473             set { cdcConfRowInstOid.4 = 100 }
474             set { cdcConfRowInstRowStatus.4 = active }
```

Fig. 4B

| | | |
|---|---|---|
| 490 | getbulk 9 | |
| 491 | | cdcAccessRowInstOid |
| 492 | | cdcAccessRowSparseInd |
| 493 | | cdcAccessObjectCounter32Val.1 /* ifInOctets */ |
| 494 | | cdcAccessObjectCounter32Val.2 /* ifOutOctets */ |
| 495 | | cdcAccessObjectCounter32Val.3 /* dot3StatsLateCollisions */ |
| 496 | | cdcAccessObjectCounter32Val.4 /* dot3StatsFCSErrors */ |

Fig. 4C

```
501     Row 1:
502         cdcAccessRowInstOid.1 = 1,
503         cdcAccessRowSparseInd.1 = 0,
504         cdcAccessObjectCounter32Val.1.1 = 1234,
505         cdcAccessObjectCounter32Val.2.1 = 5678,
506         cdcAccessObjectCounter32Val.3.1 = 34,
507         cdcAccessObjectCounter32Val.4.1 = 45
508
509     Row 2:
510         cdcAccessRowInstOid.2 = 3
511         cdcAccessRowSparseInd.2 = 0
512         cdcAccessObjectCounter32Val.1.2 = 4321,
513         cdcAccessObjectCounter32Val.2.2 = 8765,
514         cdcAccessObjectCounter32Val.3.2 = 35,
515         cdcAccessObjectCounter32Val.4.2 = 22
516
517     Row 3:
518         cdcAccessRowInstOid.3 = 40,
519         cdcAccessRowSparseInd.3 = 12, /* columns 3 & 4 are sparse*/
520         cdcAccessObjectCounter32Val.1.3 = 1234,
521         cdcAccessObjectCounter32Val.2.3 = 5678,
522         cdcAccessObjectCounter32Val.3.3 = 9879824,  -- invalid value
523         cdcAccessObjectCounter32Val.4.3 = 334347    -- invalid value
524
525     Row 9:
526         cdcAccessRowInstOid.9 = 100,
527         cdcAccessRowSparseInd.9 = 0,
528         cdcAccessObjectCounter32Val.1.9 = 4321,
529         cdcAccessObjectCounter32Val.2.9 = 8765,
530         cdcAccessObjectCounter32Val.3.9 = 99,
531         cdcAccessObjectCounter32Val.4.9 = 99
```

Fig. 5A

```
540         Row 4:
541             cdcAccessRowInstOid.4 = 41,
542             cdcAccessRowSparseInd.4 = 12,/* Bitmap indicating column 3 & 4 are sparse*/
543             cdcAccessObjectCounter32Val.1.4 = 3456,
544             cdcAccessObjectCounter32Val.2.4 = 3456,
545             cdcAccessObjectCounter32Val.3.4 = 897987, -- invalid value
546             cdcAccessObjectCounter32Val.4.4 = 799889  -- invalid value
547
548         Row 5:
549             cdcAccessRowInstOid.5 = 42,
550             cdcAccessRowSparseInd.5 = 0,
551             cdcAccessObjectCounter32Val.1.5 = 1234,
552             cdcAccessObjectCounter32Val.2.5 = 5678,
553             cdcAccessObjectCounter32Val.3.5 = 23,
554             cdcAccessObjectCounter32Val.4.5 = 87
555
556         Row 6:
557             cdcAccessRowInstOid.6 = 43,
558             cdcAccessRowSparseInd.6 = 0,
559             cdcAccessObjectCounter32Val.1.6 = 3456,
560             cdcAccessObjectCounter32Val.2.6 = 3456,
561             cdcAccessObjectCounter32Val.3.6 = 56,
562             cdcAccessObjectCounter32Val.4.6 = 98
563
564         Row 7:
565             cdcAccessRowInstOid.7 = 44,
566             cdcAccessRowSparseInd.7 = 12,
567             cdcAccessObjectCounter32Val.1.7 = 1234,
568             cdcAccessObjectCounter32Val.2.7 = 5678,
569             cdcAccessObjectCounter32Val.3.7 = 9879824, -- invalid
570             cdcAccessObjectCounter32Val.4.7 = 334347   -- invalid
571
572         Row 8:
573             cdcAccessRowInstOid.8 = 45,
574             cdcAccessRowSparseInd.8 = 0,
575             cdcAccessObjectCounter32Val.1.8 = 3456,
576             cdcAccessObjectCounter32Val.2.8 = 3456,
577             cdcAccessObjectCounter32Val.3.8 = 11,
578             cdcAccessObjectCounter32Val.4.8 = 23
```

Fig. 5B

EFFICIENT RETRIEVAL OF DESIRED INFORMATION FROM AGENTS

BACKGROUND OF THE INVENTION

1. Field of the Invention

The present invention relates to network management, and more specifically to a method and apparatus for efficiently retrieving desired information from network elements.

2. Related Art

Agents are often implemented associated with network elements to provide information of interest about network elements. In a typical scenario, an agent receives a request for information (related to a network element) from a network management station (NMS), and sends a response containing the requested information. The agent may interface with the network element to gather the requested information before generating the response.

To facilitate communication between a NMS and agents, management protocols such as Simple Network Management Protocol (SNMP) have been used. The management protocols in turn identify specific information of interest using Management Information Bases (MIB). A MIB (hereafter "base MIB") generally specifies information elements of interest for each entity (e.g., interface, system, etc.) and generally assigns a unique identifier associated with each information element. For example, a get-request command may contain a number 1.3.6.1.2.1.2.2.1 to identify that the value in a counter maintaining Ethernet Collisions is to be provided.

An NMS may use commands such as get-request or get-next request to request specific information related to a network element from an agent. A get-request command is used when there is only a single instance of the information. On the other hand a get-next request command is used to request one of many instances of information. A receiving agent retrieves the requested data/information from the MIB and sends a response with the retrieved information.

One problem with the above noted basic approach (SNMP version 1) is that retrieval of many instances of information (viewed as a table) generally requires a corresponding number of get-next request commands (and responses thereto). The processing and traffic overhead resulting from such requests/responses may be undesirable at least in some environments (particularly in large networks).

Accordingly, later implementations of SNMP (described in "RFC 1905: Protocol Operations for Version 2 of the Simple Network Management Protocol (SNMPv2)", incorporated into the present application in its entirety herewith) generally provided for more commands such as Get-Bulk request which enables multiple instances of the information to be retrieved using a single request. Accordingly, processing and traffic overhead may be reduced in comparison to SNMP version 1 based implementation.

However, one limitation of SNMP version 2 is that a user may have to cause retrieval of all instances in a range even if only some of the dis-contiguous instances are of interest. For example, assuming that instances 5-10, 398, and 500-700 are of interest, all the instances 5-700 may need to be requested to retrieve the information using a single request. Again, the processing and traffic overhead resulting from retrieval of unneeded instances may be undesirable.

Another limitation of SNMP version 2 is that multiple requests may need to be sent to retrieve information in different base MIBs. The resulting processing and traffic overhead may also be undesirable.

Therefore, what is needed is a method and apparatus for retrieving desired information from agents while meeting one or more of such requirements.

BRIEF DESCRIPTION OF THE DRAWINGS

The present invention will be described with reference to the accompanying drawings, wherein:

FIG. 4A contains various commands using which a NMS may specify information elements of interest from various/single MIBs;

FIG. 4B contains various commands using which a NMS may specify instances of interest from various/single MIBs;

FIG. 4C contains a command using which a NMS may retrieve information of interest from various/single MIBs;

FIG. 5 is a diagram illustrating the format in which a NMS may receive up-to-date data related to the specified information of interest.

In the drawings like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

An aspect of the present invention enables a meta MIB to be implemented in an agent, which allows an NMS to specify any information elements of interest from potentially multiple base MIBs and/or dis-contiguous instances (rows). The specified information may then be retrieved any time by a request command. Accordingly, only the desired information can be specified and retrieved conveniently by implementing meta MIBs in various agents.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
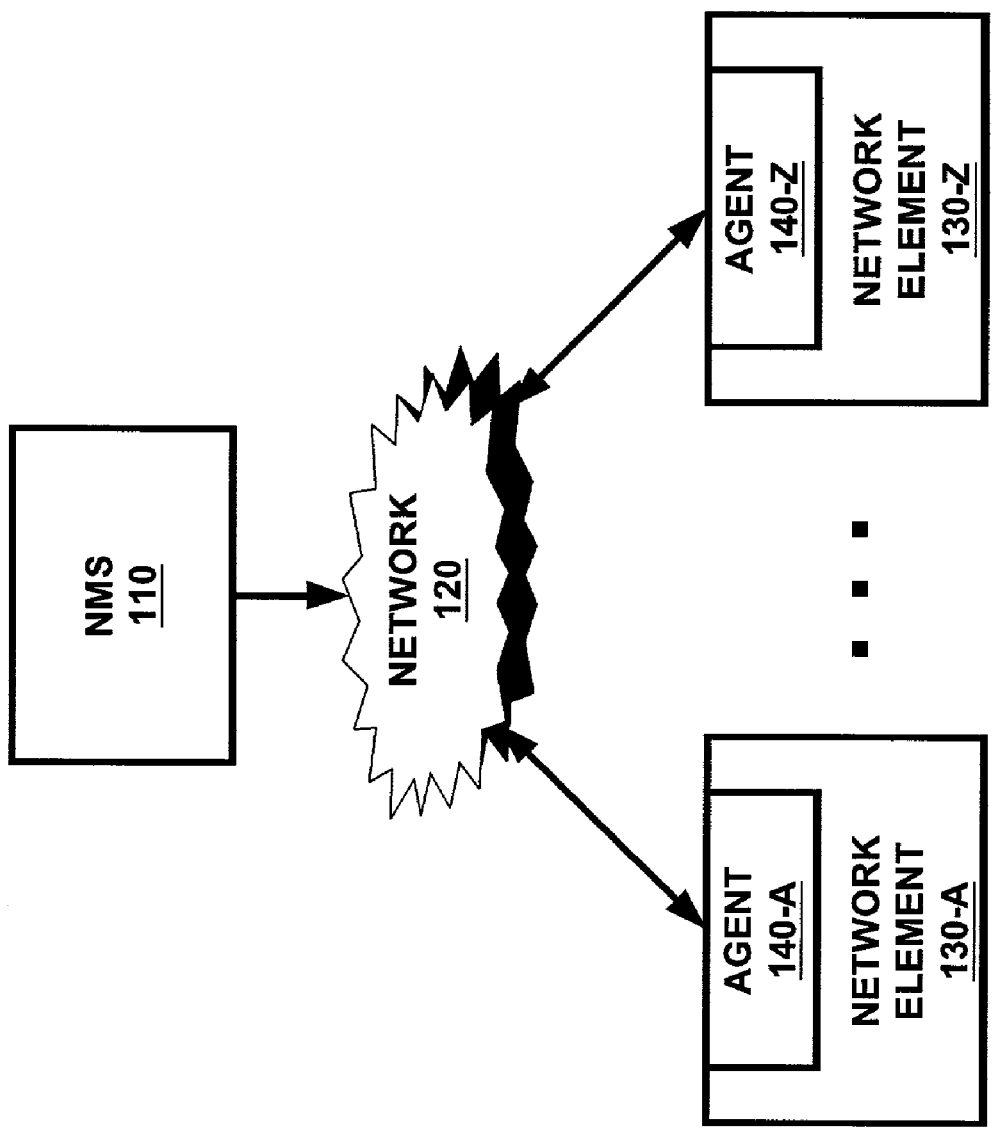
FIG. 1 is a block diagram illustrating an example environment in which the present invention can be implemented.

FIG. 1 is a block diagram illustrating an example environment in which the present invention can be implemented. The environment is shown containing network management station (NMS) 110, network 120, and network elements 130-A through 130-Z. Each system is described in further detail below.

Network elements 130-A through 130-Z are described with reference to device 130-A only for conciseness. However, the description may be applicable to other network elements as well. Network element 130-A generally contains (stores) various pieces of information identified by potentially many base MIBs. Some of the information is logically viewed as many instances (e.g., each routing entry of a routing table may be viewed as an instance).

Agents 140-A through 140-Z are respectively shown contained in devices 130-A through 130-Z. The agents are described with reference to agent 140-A for conciseness. Even though shown implemented within network element 130-A, agents may be implemented externally, in which case agent 130-A is referred to as a proxy agent. Agent 140-A may be implemented as a combination of one or more of hardware, software and firmware.

NMS 110 interfaces with agent 140-A to retrieve information of interest according to various features of the present invention. The manner in which the information can be retrieved is described below with reference to various examples.

3. Network Element

Figure 2:
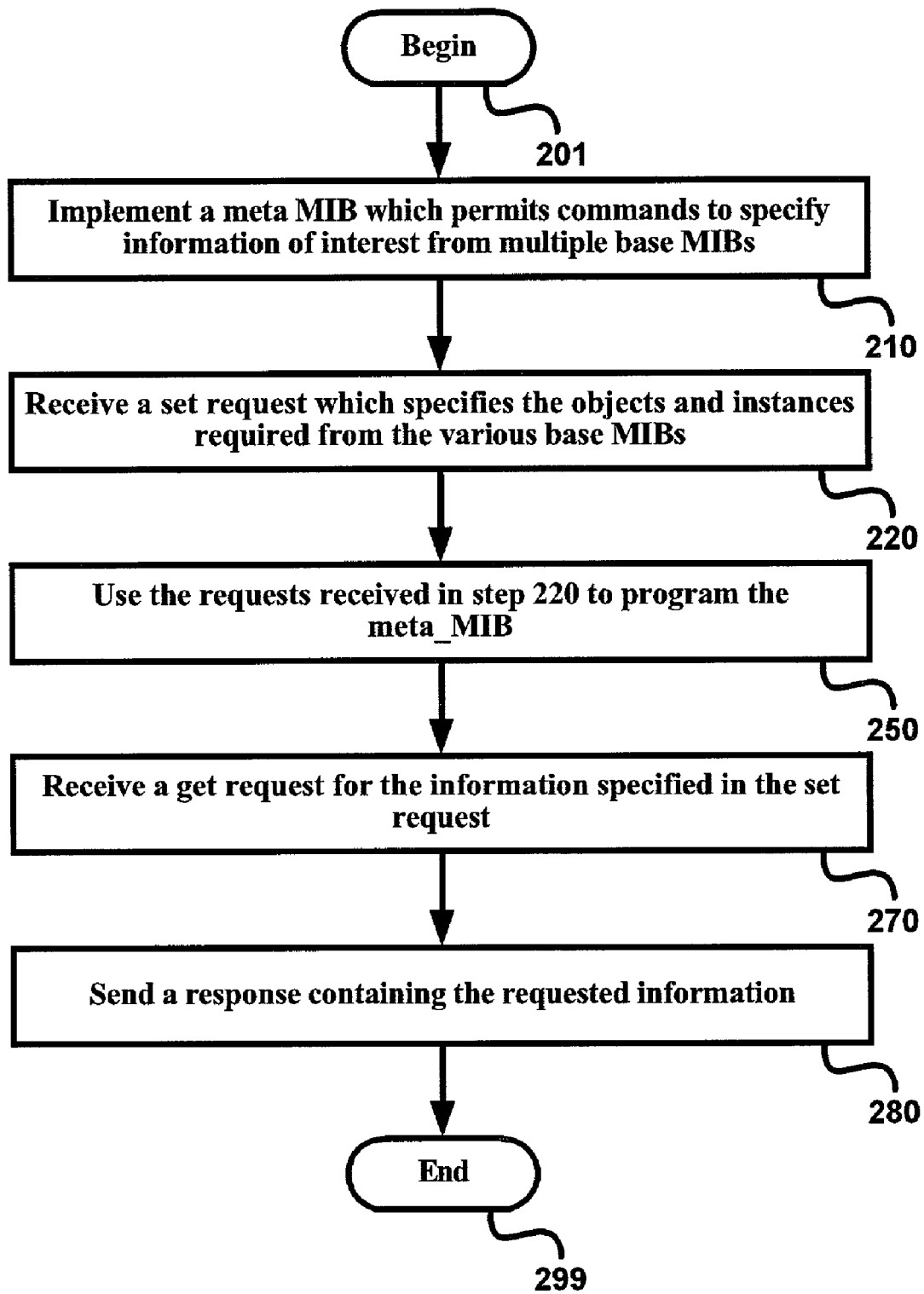
FIG. 2 is a flowchart illustrating a method using which a network element enables a network management station to conveniently retrieve desired pieces of information from various MIBs.

FIG. 2 is a flowchart illustrating a method using which a network element enables a network management station to conveniently retrieve desired pieces of information from various base MIBs. The flowchart is described with reference to the systems of FIG. 1 for illustration. However, the invention can be implemented in other environments as well. The method begins in step 201, in which control immediately passes to step 210.

In step 210, a meta MIB may be implemented within network element 130-A. The meta MIB provides a convention according to which requests may be sent specifying information elements of interest in potentially different base MIBs, and the specific instances (rows) of the information elements that are of interest. Example meta MIBs and the manner in which the meta MIBs can be implemented, are described in sections below.

In step 220, network element 130-A receives set requests which specify the information elements and instances required from various/single base MIB(s). For example, a request received by network element may specify only ifInOctet and ifOutOctet as information elements (i.e., columns) of interest from a base MIB commonly known as if Table. In the same manner, another set request received by network element may specify only instances (i.e., rows) of interest from various/single base MIB(s).

In step 250, network element 130-A makes use of the set requests received in step 220 to program the meta MIB. Programming the meta MIB generally entails confirming that the requests are consistent with the definition of the meta MIB, and storing data to representing the information requested. The logic underlying the implementation of the meta MIB (step 210) may enable such programming.

In step 270, network element 130-A receives a get request for the information specified in the set request(s). The get request may request specific information of interest programmed in the meta MIB.

In step 280, network element 130-A sends a response containing the requested information. Typically, agent 140-A interprets the get request, retrieves the requested information from various components of network element 130-A, and generates a response based on the programmed meta MIB. The generated response may be sent in a known way.

Thus, an aspect of the present invention enables a network element to send data related to multiple base MIBs and/or dis-contiguous instances of a MIB element using a single request for information. Similarly, a NMS may use the features provided by network elements, as described below with examples in further detail.

4. NMS

Figure 3:
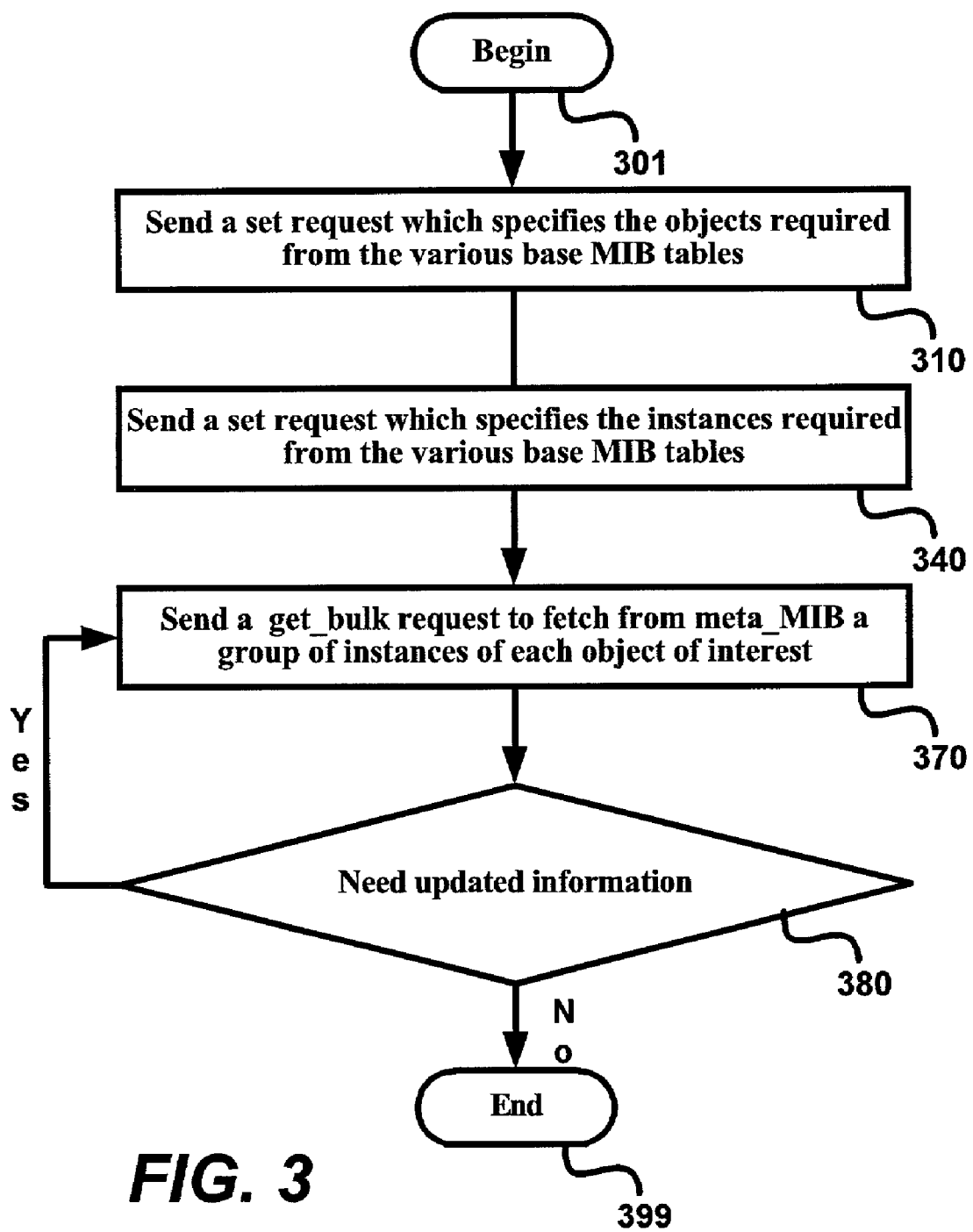
FIG. 3 is a flowchart illustrating a method using which a NMS may retrieve desired information efficiently.

FIG. 3 is a flowchart illustrating a method using which a NMS may retrieve desired information efficiently according to an aspect of the present invention. The flowchart is described with reference to NMS 110 for illustration. However, the invention can be implemented in other systems as well. The method begins in step 301, in which control immediately passes to step 310.

In step 310, NMS 110 may send a set request consistent with a definition of a meta MIB implemented in a network element. The set request specifies the specific information elements of interest from various/single MIB(s). The request can be sent according to any protocol on any path, for example, on network 120 using Internet Protocol. In an embodiment described below, the request is sent consistent with SNMP well known in the relevant arts.

In step 340, NMS 110 may send a set request which specifies the instances required from various/single MIB(s). The request may generally specify only the instances (i.e., rows) of interest. Steps 310 and 340 cause the meta MIB to be programmed in the network element as described above with reference to FIG. 2.

In step 370, NMS 110 may send a get request to fetch from meta MIB the information elements/instances programmed in steps 310 and 340. In an embodiment described below, a get-bulk request consistent with SNMP is used. The get-bulk request of the embodiment is designed to specify potentially a sub-set of the information elements specified in steps 310 and 340. The request further specifies and a number of instances common to all the information elements to be retrieved.

In step 380, NMS 110 may determine whether more up-to-date information is required. For example, NMS 110 may be set up to periodically poll the up-to-date information and maintain a log of the counters. In such situations, control passes to step 370, and a get request command may be sent again to retrieve the up-to-date information. If up-to-date information is not needed, control passes to step 399, in which the method ends.

Thus, an aspect of the present invention enables an NMS 110 to receive data related to multiple base MIBs and/or dis-contiguous instances from single base MIB using a single request for information. The manner in which a NMS 110 may send commands to program a meta MIB to specify information elements of interest is described below with examples.

5. Commands to Specify Information Elements of Interest

FIG. 4A contains various commands using which a NMS may specify information elements of interest from various/single MIBs. The corresponding new meta MIB ("my MIB") supporting such commands is listed in Appendix A. It may be appreciated that the meta MIB of Appendix A is simplified version presented for purpose of illustration of some aspects of the present invention. Appendix B contains a more detailed meta MIB which can be implemented in alternative embodiments.

Continuing with reference to FIG. 4A, the information of interest is assumed to include ifInOctets and ifOutOctets information elements from ifTable, and dot3StatsLateCollisions and dot3StatsFCSErrors information elements from dot3StatsTable. The tables and information elements included in the present application are described in various MIBs available from various RFCs. The commands which can be used to program the meta MIB with the information elements of interest, are described below.

Lines 403-406 operate to create the first information element of interest in network element 130-A. Line 406 sets cdcConfObjectOid.1 equal to the Object Identifier of ifInOctets (i.e.,1.3.6.1.2.1.2.2.1.10) to indicate that the first information element of interest is the ifInOctets object. The logic underlying the cdcConfObjectOid program object is described around line 75 of Appendix A.

Line 403 specifies that the row should remain temporarily inactive by setting cdcConfObjectRowStatus.1 equal to createAndWait. The inactive status is maintained until all other objects in the row are set as recommended in RFC 2579, available from www.ietf.org, which is incorporated in its entirety herewith into the present application.

Thus, once the command of line 406 is processed, the row is set to active status in line 409 by setting cdcConfObjectRowStatus.1 set equal to Active, enabling the corresponding data to be available for potential retrieval. The logic underlying cdcConfObjectRowStatus is described around line 84 (line numbers shown on right hand side) of Appendix A.

Lines 414-417, 419-422 and 424-427 respectively indicate that ifOutOctets, dot3StatsLateCollisions and dot3StatsFCSErrors are of interest. It may be noted that an index (1-4) is added in each command line to differentiate between the different information elements of interest.

The commands thus sent cause meta-MIB in the target agent to be programmed with the information. The implementation of a network element to be thus programmed is described with an example in sections below. An NMS may further specify the specific instances (rows) of interest for each information element as described below.

6. Commands to Specify Instances of Interest

FIG. 4B contains various commands using which a NMS may specify instances of interest from various/single base MIBs. The manner in which the instances may be specified is described with reference to the meta MIB of appendix B again for illustration. It is further assumed that the information of interest includes instances 1, 3, 40-45, and 100 in both the ifTable and dot3StatsTable. The commands which can be used to program the meta MIB with such instances of interest, are described below.

Lines 441-451 (of FIG. 4B) together specify that instance 1 (ifIndex=1) is of interest Line 445 first specifies that an individual instance is going to be specified by setting cdcConfRowInstType.1='individual'. Line 448 then specifies that instance 1 is of interest by setting cdcConfRowInstOid.1=1. cdcConfRowInstType and cdcConfRowInstOid are respectively noted in line 129 and 140 of Appendix A.

The entry is made temporarily inactive until the instance is programmed in the network element by first setting (cdcConfRowInstRowStatus.1=createAndWait) in line 441 and (cdcConfRowInstRowStatus.1=active) in line 451. The creation and activation are described in further detail around line 183 of Appendix A. Similarly, lines 456-460 and 469-473 respectively specify that individual instances 3 and 100 are of interest.

Lines 462-467 illustrate the manner in which a range of rows can be specified as being of interest. Thus, in line 464, cdcConfRowInstType.3 is set equal to 'range', to indicate that a range of instances are of interest. The start and end of ranges are respectively specified by setting (cdcConfRowInstOid.3=40) and (cdcConfRowInstOidEnd.3=45) in lines 465 and 466. The instances are placed in temporary inactive status while the data is being stored in the network element using the commands in lines 463 and 467.

While multiple commands are shown being used to specify the non-contiguous instances, an alternative embodiment may be implemented to send a single command to specify the instances. Similarly, a single command may be used to specify the information elements of interest, for example, consistent with RFC 1905. Once the information elements and instances of interest are specified, the corresponding data can be retrieved potentially using a single command as described below with examples.

7. Commands to Retrieve Data from Meta MIB

FIG. 4C contains command using which a NMS may retrieve the previously specified information of interest. In an embodiment described below, the command is specified in the form of a SNMP get-bulk request. A get-bulk request has the general format "get-bulk <max-repetitions> object1 object2 . . . ", wherein <max-repetitions> specifies how many instances of the objects have to be fetched. The get-bulk request is described in further detail in RFC 1905 (available from www.ietf.org), which is incorporated in its entirety herewith. The command can be used to retrieve instances of interest from the programmed meta MIB, as described below.

In line 490, NMS 110 may send a get-bulk request specifying that nine instances may have to be retrieved. In line 491, NMS 110 specifies, a program object (here, "cdcAccessRowInstOid") to be used by network element for sending the object identifier of each row. Lines 493-496 respectively specify the four information elements programmed earlier need to be retrieved. Line 492 includes an entry 'cdcAccessRowSparseInd', which is used to receive a sparse index associated with the retrieved data. The concept underlying the sparse index is described first, followed by the data that may be sent from the network element to the NMS in response to the get-bulk request PDU.

8. Sparse Index

Sparse index generally indicates the specific entries which are valid or invalid in the received data. The entry may be invalid, for example, because the specific information element is not applicable for the corresponding column. By having the sparse index information available in the data sent to the NMS, the parsing of the data may be simplified in the NMS.

In an embodiment described below, the sparse index is provided in the form of a mask associated with each instance to indicate whether the entries in the instance contain valid data or not. The manner in which the sparse index related data is used is described below with reference to the data sent in response to the get-bulk request noted above.

9. Retrieval

FIGS. 5A and 5B illustrate the format in which a NMS may receive information elements of interest in response to sending the get-bulk request of FIG. 4C. Lines 501-507 together represent the value associated with the four information elements of interest for the first instance (ifIndex=1) of interest. Line 502 specifies that row index equals 1 (i.e., first row) by setting cdcAccessRowInstOid.1=1. Line 503 then indicates all entries of the first instance are valid by setting cdcAccessRowSparseInd.1=0. Lines 504-507 indicate the row values for the specified information elements of interest. Similarly, lines 509-515, 517-523 and 525-531 respectively contain the data corresponding to individual instances 3, 40 and 100 previously indicated to be of interest.

Continuing with reference to FIG. 5B, NMS 110 is assumed to receive values from both ifTable and dot3StatsTable. Lines 540-581 illustrate the format in which values associated with a range of rows (40-45) may be returned. Line 541 indicates that the instance relates to ifIndex equal to 40 since cdcAccessRowInstOid.3=40. Line 542 then indicates the existence of sparse index for the row by setting cdcAccessRowSparseInd.3=12. The value 12 indicates that cdcAccessObjectCounter32Val for the third and fourth information element present in line 545-546 (i.e., cdcAccessObjectCounter32Val.3.3 and cdcAccessObjectCounter32Val.4.3) have invalid values. The content of remaining instances 5-8 are described similarly.

In general, the values corresponding to the base MIB objects are retrieved through the information elements specified in lines 512, 513, 514 and 525. The convention employed is described with reference to line 513 of FIG. 5A which reads, "cdcAccessObjectCounter32Val.2.2=8765". As may be noted, the number immediately after cdcAccessObjectCounter32Val is 2. This corresponds to cdcAccessObjectIndex defined around line 290 of appendix A. The value of cdcAccessObjectIndex is the same as that of cdcConfObjectIndex. Thus, it identifies the base MIB object specified in cdcConfObjectTable for which this information element contains a value.

The last number suffixed (appended) to the information element in line 513, is cdcAccessRowIndex. The value of cdcAccessRowIndex represents a running count, starting from one and incremented by one for every row represented by in the cdcAccessRowTable. This helps in uniquely identifying each instance of the information element in line 513.

To facilitate retrieval of information according to the convention above, the meta-MIB needs to be implemented on a network agent (and the meta-MIB programmed) before the network agent can respond to NMS requests and send the data as described above. The manner in which the network agent/element can be implemented accordingly is described below.

10. Network Agent

The implementation of network agent 140-A may entail four primary tasks; (A) a meta MIB needs to be first implemented within a network agent/element; (B) programming the meta MIB in response to receiving commands specifying information elements of interest; (C) interfacing with network element 130-A to retrieve the information of interest in response to receiving the get (bulk) requests; and (D) sending the retrieved information.

In general, the implementation of (C) needs to be consistent with the interfaces available within network element to gather various pieces of data (typically in the form of counters or registers), and may be implemented in a known way. Once data is gathered, (D) also can be performed in a known way, for example, using SNMP over UDP/IP.

(A) and (B) generally entail implementing a program logic in network agent 140-A. The program logic needs to be implemented to receive set commands which specify the information elements of interest. The information in the set commands then needs to be stored in the appropriate data structures such that when a get request is later received, the program logic can easily determine the specific information (information elements and instances) which has been specified to be of interest ("programming the meta MIB"). When a get request is received, the data structures need to be examined, and (C) and (D) need to be performed to provide a response.

The program logic of above generally needs to be implemented consistent with a meta MIB. The examples in the previous section are described with the example meta-MIB of Appendix A. However, a more comprehensive meta MIB listed in Appendix B may be used in alternative embodiments.

In general, a SNMP MIB compiler is used to compile the meta MIBs. Detailed information about SNMP MIB compilers is available from a web site with URL: www.snmp.com. In an embodiment, a MIB compiler commonly referred to as "SNMP Research compiler" commercially available from the market place is used to compile the meta MIBs.

In an embodiment, the compilation generates empty stub routines (referred to as stub functions in the relevant technological arts) associated with each table in the meta-MIB. A get and set routine may be generated associated with each table, except that only a get routine would be generated associated with read-only tables. A developer then generates the necessary software instructions in each stub routine. For example, with reference to the meta-MIB of Appendix A, the following stub routines could be generated:

cdcConfObjectTable: cdcConfObjectEntry_get( ) and cdcConfObjectEntry_set( )

cdcConfRowInstTable: cdcConfRowInstEntry_get( ) and cdcConfRowInstEntry_set( )

cdcAccessRowTable: cdcAccessRowEntry_get( )

cdcAccessObjectTable: cdcAccessObjectEntry_get( )

When the set commands of FIG. 4A are received in a network element, the set_ConfObjectEntry( ) routine is invoked. The necessary parameters are passed as arguments or parameters to the routine. The code implemented by the developer would create the data structures to store information about each base MIB object specified in the set commands. Similarly, each set command in FIG. 4B would result in invocation of set_ConfRowInstEntry( ), which would create the data structures to store information about the row instances specified in the set commands.

When the get-bulk command of FIG. 4C is received, it would result in both get_AccessRowEntry( ) and get_AccessObjectEntry( ) to be invoked. These routines use the information stored during the set commands to fetch the required row instances of the base MIB objects, and send the retrieved information as a get-bulk response PDU. Thus, network elements implemented according to various aspects of the present invention may send the values related to the information elements of interest to an NMS requesting the information.

It may be noted that an aspect of the present invention supports a sparse index feature. A developer may need to develop the code for the cdcAccessRowSparseInd object (around line 228 of Appendix A). In general, some of the information element elements of interests may not be supported in a network element, and the corresponding entries need to be marked as invalid when sending a response to a NMS. A stub associated with sparse index related activities may determine whether a specific information element is supported in the network element (for example based on examination of appropriate data stored in the network element), and generate the appropriate bit value for the corresponding entry of the sparse index. The stub would be invoked in response to receiving the cdcAccessRowSparseInd parameter in the get-bulk request.

Thus, by appropriate support for meta MIBs in the network agents and NMS, the information of interest can be retrieved efficiently as described above. The network agents and NMS can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing each of network agents and NMS with a desired mix of hardware, software and/or firmware. An embodiment implemented substantially in software is described below.

11. Software Implementation

Figure 6:
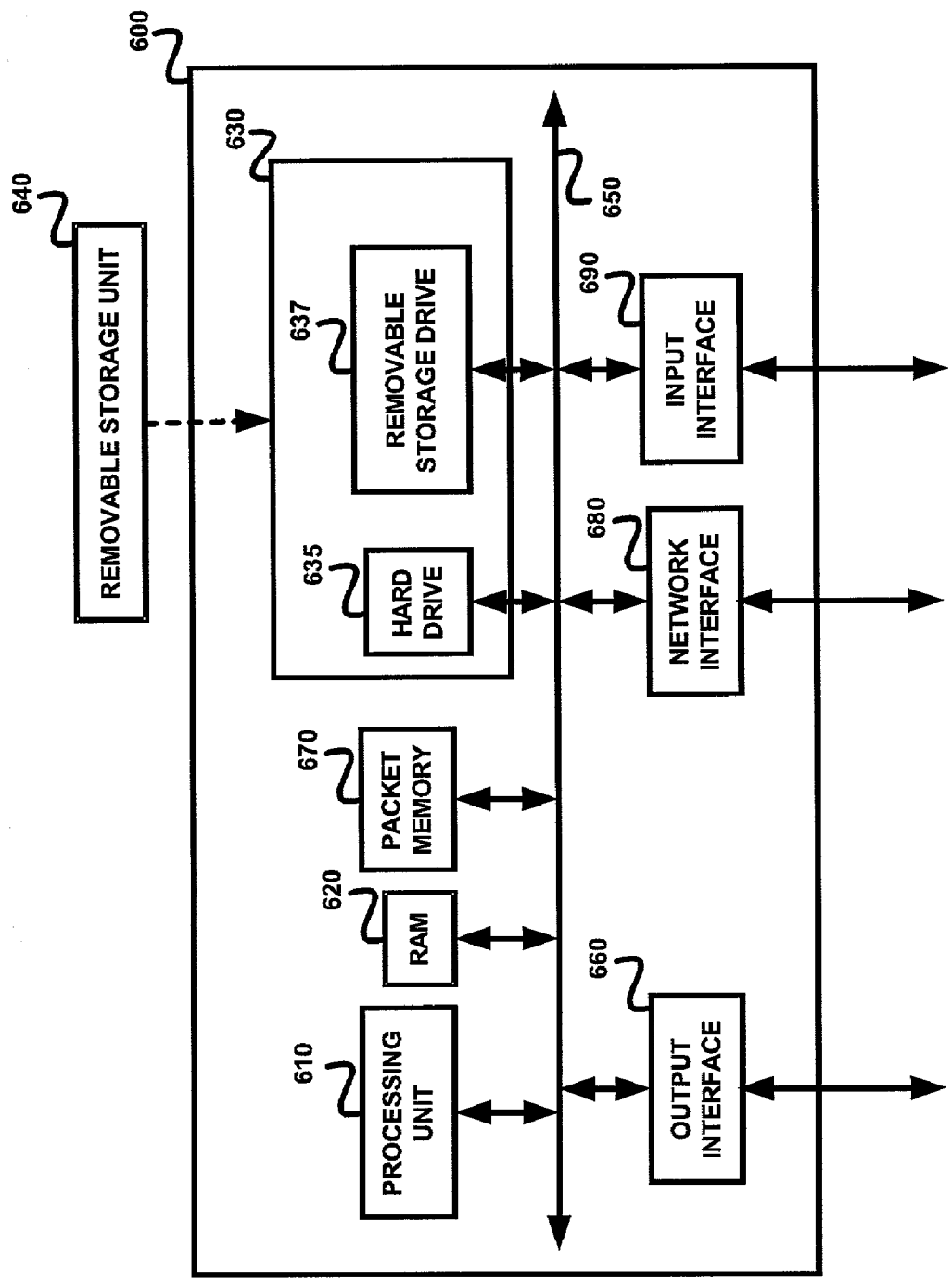
FIG. 6 is a block diagram illustrating the details of an embodiment of the present invention substantially in the form of software.

FIG. 6 is a block diagram illustrating the details of system 600 in one embodiment. System 600 may correspond to any one of NMS 110 and network elements 130-A through 130-Z. System 600 is shown containing processing unit 610, random access memory (RAM) 620, storage 630, output interface 660, network interface 680 and input interface 690. Each block is described in further detail below.

Output interface 660 provides output signals (e.g., display signals to a display unit, not shown) which can form the basis for a suitable interface for an administrator (configuring system 400) to interact with system 400. Input interface 690 (e.g., interface with a key-board and/or mouse, not shown) enables a user/administrator to provide any necessary inputs (e.g., configuration of a meta MIB in the case of an agent and initiating a get request in the case of a NMS) to system 400.

Network interface 680 may enable system 400 to send and receive the set and get requests using protocols such as TCP/IP. Network interface 680, output interface 660 and input interface 690 may be implemented in a known way.

RAM 620 receives instructions and data on path 650 from storage 630, and provides the instructions to processing unit 610 for execution. Secondary memory 630 may contain units such as hard drive 635 and removable storage drive 637. Secondary storage 630 may store the software instructions and data, which enable System 400 to provide several features in accordance with the present invention.

While secondary memory 630 is shown contained within system 400, an alternative embodiment may be implemented with the secondary memory implemented external to system 400, and the software instructions (described below) may be provided using network interface 680.

Some or all of the data and instructions may be provided on removable storage unit 640 (or from a network using protocols such as Internet Protocol), and the data and instructions may be read and provided by removable storage drive 637 to processing unit 610. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for network management). The special purpose processors may also be provided instructions from RAM 620.

In general processing unit 610 reads sequences of instructions from various types of memory medium (including RAM 620, storage 630 and removable storage unit 640), and executes the instructions to provide various features of the present invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting efficient retrieval of information of interest from a network element, said method being performed in an agent, said method comprising:
    implementing a meta MIB in said agent, wherein said meta MIB enables specifying information elements of interest from a plurality of base MIBs;
    receiving a first command specifying that a first information element of interest in said network element is to be accessible using said meta MIB, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier;
    storing data representing that said first information element of interest has been specified to be accessible using said meta MIB;
    receiving a second command requesting a data value corresponding to said first information element of interest using said meta MIB, wherein said second command identifies said first information element by said second identifier; and
    sending a response containing said data value in response to receiving said second command.

2. The method of claim 1, wherein said meta MIB enables specifying non-contiguous instances of said information element, said method further comprising receiving a third command specifying a plurality of non-contiguous instances of said first information element of interest are to be accessible using said meta MIB, wherein said response comprises data values corresponding to said plurality of non-contiguous instances.

3. The method of claim 1, wherein said meta MIB enables specifying non-contiguous instances of said information element, said method further comprising receiving a third plurality of commands specifying that a plurality of non-contiguous instances of said first information element of interest are to be accessible using said meta MIB, wherein said response comprises data values corresponding to said plurality of non-contiguous instances.

4. The method of claim 3, wherein said third plurality of commands comprises a fourth command specifying a single instance and a fifth command specifying a range of instances.

5. The method of claim 1, further comprising receiving a first plurality of commands including said first command, wherein each of said first plurality of commands specifies that an information element of interest in a corresponding one of said plurality of base MIBs is accessible using said meta MIB.

6. The method of claim 5, wherein said storing stores in a data structure data representing said information elements of interest, said method further comprising:
examining said data structure in response to receiving said second command; and
interfacing with said network element to retrieve data corresponding to said information elements of interest represented by said data structure, wherein said response comprises data retrieved by said interfacing.

7. The method of claim 6, wherein said meta MIB comprises a plurality of program objects, wherein each of said information elements of interest is identified by an index associated with one of said plurality of program objects.

8. The method of claim 7, wherein the instances of interest for said information elements of interest are identified by another index associated with another one of said plurality of program objects.

9. The method of claim 8, further comprising:
receiving a create and wait command prior to receiving said first command, wherein said create and wait command specifies that an associated instance is to remain inactive; and
receiving an active command after receiving said first command, wherein said associated instance is made active in response to said active command, wherein data value related to said associated instance is sent in said response only after said active command is received.

10. The method of claim 1, wherein said first command comprises a set command and said second command comprises a get command, and wherein said set command and said get command are received according to SNMP.

11. The method of claim 10, wherein said get command comprises a get bulk request.

12. The method of claim 11, wherein said get bulk request specifies a sparse object as a parameter and wherein said response comprises a sparse index indicating whether said response contains a valid entry.

13. The method of claim 12, wherein said first command comprises a set command and said second command comprises a get command, and wherein said set command and said get command are received according to SNMP.

14. The method of claim 13, wherein said get command comprises a get bulk request.

15. The method of claim 14, wherein said get bulk request specifies a sparse object as a parameter and wherein said response comprises a sparse index indicating whether said response contains a valid entry.

16. A method of efficiently retrieving information of interest from a network element, said method being performed in a network management station (NMS), said method comprising:
sending to said network element a first command specifying a first information element of interest in said network element is to be accessible using a meta MIB, wherein said meta MIB is implemented in said agent and enables specifying information elements of interest from a plurality of base MIBs, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier;
sending a second command requesting a data value corresponding to said first information element of interest using said meta MIB, wherein said second command identifies said first information element by said second identifier; and
receiving a response containing said data value in response to sending said second command.

17. The method of claim 16, wherein said meta MIB enables specifying non-contiguous instances of said information element, said method further comprising sending a third command specifying that a plurality of non-contiguous instances of said first information element of interest are to be accessible using said meta MIB, wherein said response comprises data values corresponding to said plurality of non-contiguous instances.

18. The method of claim 17, wherein said third plurality of commands comprises a fourth command specifying a single instance and a fifth command specifying a range of instances.

19. The method of claim 16, further comprising sending a first plurality of commands including said first command, wherein each of said first plurality of commands specifies that an information element of interest in a corresponding one of said plurality of base MIBs is accessible using said meta MIB.

20. The method of claim 19, wherein said meta MIB comprises a plurality of program objects, wherein each of said information elements of interest is identified by an index associated with one of said plurality of program objects.

21. The method of claim 20, wherein the instances of interest for said information elements of interest are identified by another index associated with another one of said plurality of program objects.

22. The method of claim 21, further comprising:
sending a create and wait command prior to receiving said first command; and
sending an active command after receiving said first command.

23. The method of claim 16, wherein each of said first command and said second command are sent to an agent having access to said information of interest of said network element, and wherein said response is received from said agent.

24. A computer readable storage medium carrying one or more sequences of instructions for causing a network element to support efficient retrieval of information of interest from said network element, wherein execution of said one or more sequences of instructions by one or more processors contained in said network element causes said one or more processors to perform the actions of: implementing a meta MIB, wherein said meta MIB enables specifying information elements of interest from a plurality of base MIBs; receiving a first command specifying a first information element of interest in said network element is to be accessible using said meta MIB, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier; storing data representing that said first information element of interest has been specified to be accessible using said meta MIB; receiving a second command requesting a data value corresponding to said first information element of interest using said meta MIB, wherein said second command identifies said first information element by said second identifier; and sending a response containing said data value in response to receiving said second command.

25. The computer readable storage medium of claim 24, wherein said meta MIB enables specifying non-contiguous instances of said information element, further comprising receiving a third command specifying that a plurality of non-contiguous instances of said first information element of interest are to be accessible using said meta MIB, wherein said response comprises data values corresponding to said plurality of non-contiguous instances.

26. The computer storage readable medium of claim 24, wherein said meta MIB enables specifying non-contiguous instances of said information element, further comprising receiving a third plurality of commands specifying that a plurality of non-contiguous instances of said first information element of interest are to be accessible using said meta MIB, wherein said response comprises data values corresponding to said plurality of non-contiguous instances.

27. The computer readable storage medium of claim 26, wherein said third plurality of commands comprises a fourth command specifying a single instance and a fifth command specifying a range of instances.

28. The computer readable storage medium of claim 24, further comprising receiving a first plurality of commands including said first command, wherein each of said first plurality of commands specifies that an information element of interest in a corresponding one of said plurality of base MIBs is accessible using said meta MIB.

29. The computer readable storage medium of claim 28, wherein said storing stores in a data structure data representing said information elements of interest, further comprising: storing in a data structure data representing said information elements of interest; examining said data structure in response to receiving said second command; and interfacing with said network element to retrieve data corresponding to said information elements of interest represented by said data structure, wherein response comprises data retrieved by said interfacing.

30. The computer readable storage medium of claim 29, wherein said meta MIB comprises a plurality of program objects, wherein each of said information elements of interest is identified by an index associated with one of said plurality of program objects.

31. The computer readable storage medium of claim 30, wherein the instances of interest for said information elements of interest are identified by another index associated with another one of said plurality of program objects.

32. The computer readable storage medium of claim 31, further comprising: receiving a create and wait command prior to receiving said first command, wherein said create and wait command specifies that an associated instance is to remain inactive; and receiving an active command after receiving said first command, wherein said associated instance is made active in response to said active command, wherein data value related to said associated instance is sent in said response only after said active command is received.

33. The computer readable storage medium of claim 24, wherein said first command comprises a set command and said second command comprises a get command, and wherein said set command and said get command are received according to SNMP.

34. The computer readable storage medium of claim 33, wherein said get command comprises a get bulk request.

35. The computer readable storage medium of claim 34, wherein said get bulk request specifies a sparse object as a parameter and wherein said response comprises a sparse index indicating whether said response contains a valid entry.

36. The computer readable storage medium of claim 35, wherein said first command comprises a set command and said second command comprises a get command, and wherein said set command and said get command are received according to SNMP.

37. The computer readable storage medium of claim 36, wherein said get command comprises a get bulk request.

38. The computer readable storage medium of claim 37, wherein said get bulk request specifies a sparse object as a parameter and wherein said response comprises a sparse index indicating whether said response contains a valid entry.

39. The computer readable storage medium of claim 24, wherein said implementing, said receiving said first command, said storing, said receiving said command, and said sending are implemented in said network element from which information is sought to be retrieved.

40. A computer readable storage medium carrying one or more sequences of instructions for causing a network management station (NMS) to efficiently retrieve information of interest from a network element, wherein execution of said one or more sequences of instructions by one or more processors contained in said NMS causes said one or more processors to perform the actions of: sending to said network element a first command specifying a first information element of interest in said network element is to be accessible using a meta MIB, wherein said meta MIB is implemented in said agent and enables specifying information elements of interest from a plurality of base MIBs, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier; sending a second command requesting a data value corresponding to said first information element of interest using said meta MIB, wherein said second command identifies said first information element by said second identifier; and receiving a response containing said data value in response to sending said second command.

41. The computer readable storage medium of claim 40, wherein said meta MIB enables specifying non-contiguous instances of said information element, further comprising sending a third command specifying that a plurality of non-contiguous instances of said first information element of interest are to be accessible using said meta MIB, wherein said response comprises data values corresponding to said plurality of non-contiguous instances.

42. The computer readable storage medium of claim 41, wherein said third plurality of commands comprises a fourth command specifying a single instance and a fifth command specifying a range of instances.

43. The computer readable storage medium of claim 40, further comprising sending a first plurality of commands including said first command, wherein each of said first plurality of commands specifies that an information element of interest in a corresponding one of said plurality of base MIBs is accessible using said meta MIB.

44. The computer readable storage medium of claim 43, wherein said meta MIB comprises a plurality of program objects, wherein each of said information elements of interest is identified by an index associated with one of said plurality of program objects.

45. The computer readable storage medium of claim 44, wherein the instances of interest for said information elements of interest are identified by another index associated with another one of said plurality of program objects.

46. The computer readable storage medium of claim 45, further comprising: sending a create and wait command prior to receiving said first command; and sending an active command after receiving said first command.

47. The computer readable storage medium of claim 40, wherein each of said first command and said second command are sent to an agent having access to said information of interest of said network element, and wherein said response is received from said agent.

48. An agent for supporting efficient retrieval of information of interest from a network element, said agent comprising:
storage means for storing data representing information elements that are specified as accessible using a meta MIB, wherein said meta MIB enables specifying information elements of interest from a plurality of base MIBs;
means for receiving a first command specifying that a first information element of interest in said network element is to be accessible using said meta MIB, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier;
means for storing data in said storage means representing that said first information element of interest has been specified to be accessible using said meta MIB;
means for receiving a second command requesting a data value corresponding to said first information element of interest using said meta MIB, wherein said second command identifies said first information element by said second identifier; and
means for sending a response containing said data value in response to receiving said second command.

49. The agent of claim 48, wherein said meta MIB enables specifying non-contiguous instances of said information element, said agent further comprising means for receiving a third command specifying that a plurality of non-contiguous instances of said first information element of interest are to be accessible using said meta MIB, wherein said response comprises data values corresponding to said plurality of non-contiguous instances.

50. The agent of claim 48, wherein said meta MIB enables specifying non-contiguous instances of said information element, said agent further comprising means for receiving a third plurality of commands specifying that a plurality of non-contiguous instances of said first information element of interest are to be accessible using said meta MIB, wherein said response comprises data values corresponding to said plurality of non-contiguous instances.

51. The agent of claim 50, wherein said third plurality of commands comprises a fourth command specifying a single instance and a fifth command specifying a range of instances.

52. The agent of claim 48, further comprising means for receiving a first plurality of commands including said first command, wherein each of said first plurality of commands specifies that an information element of interest in a corresponding one of said plurality of base MIBs is accessible using said meta MIB.

53. The agent of claim 52, wherein said storage means stores in a data structure data representing said information elements of interest, said agent further comprising:
means for storing in a data structure data representing said information elements of interest;
means for examining said data structure in response to receiving said second command; and
means for interfacing with said network element to retrieve data corresponding to said information elements of interest represented by said data structure, wherein response comprises data retrieved by said interfacing.

54. The agent of claim 53, wherein said meta MIB comprises a plurality of program objects, wherein each of said information elements of interest is identified by an index associated with one of said plurality of program objects.

55. The agent of claim 53, wherein the instances of interest for said information elements of interest are identified by another index associated with another one of said plurality of program objects.

56. The agent of claim 55, further comprising:
means for receiving a create and wait command prior to receiving said first command, wherein said create and wait command specifies that an associated instance is to remain inactive; and
means for receiving an active command after receiving said first command, wherein said associated instance is made active in response to said active command, wherein data value related to said associated instance is sent in said response only after said active command is received.

57. The agent of claim 48, wherein said first command comprises a set command and said second command comprises a get command, and wherein said set command and said get command are received according to SNMP.

58. The agent of claim 57, wherein said get command comprises a get bulk request.

59. The agent of claim 58, wherein said get bulk request specifies a sparse object as a parameter and wherein said response comprises a sparse index indicating whether said response contains a valid entry.

60. The NMS of claim 59, wherein said first command comprises a set command and said second command comprises a get command, and wherein said set command and said get command are sent according to SNMP.

61. The NMS of claim 60, wherein said get command comprises a get bulk request.

62. The NMS of claim 61, wherein said get bulk request specifies a sparse object as a parameter and wherein said response comprises a sparse index indicating whether said response contains a valid entry.

63. The agent of claim 48, wherein all of said storage means, said means for receiving said first command, said means for storing, said means for receiving said second command, and said means for sending said response are contained in a single physical unit.

64. A network management station (NMS) for efficiently retrieving information of interest from a network element, said NMS comprising:
  means for sending to said network element a first command specifying a first information element of interest in said network element is to be accessible using a meta MIB, wherein said meta MIB is implemented in said agent and enables specifying information elements of interest from a plurality of base MIBs, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier;
  means for sending a second command requesting a data value corresponding to said first information element of interest using said meta MIB, wherein said second command identifies said first information element by said second identifier; and
  means for receiving a response containing said data value in response to sending said second command.

65. The NMS of claim 64, wherein said meta MIB enables specifying non-contiguous instances of said information element, said NMS further comprising means for sending a third command specifying that a plurality of non-contiguous instances of said first information element of interest are to be accessible using said meta MIB, wherein said response comprises data values corresponding to said plurality of non-contiguous instances.

66. The NMS of claim 65, wherein said third plurality of commands comprises a fourth command specifying a single instance and a fifth command specifying a range of instances.

67. The NMS of claim 64, further comprising means for sending a first plurality of commands including said first command, wherein each of said first plurality of commands specifies that an information element of interest in a corresponding one of said plurality of base MIBs is accessible using said meta MIB.

68. The NMS of claim 67, wherein said meta MIB comprises a plurality of program objects, wherein each of said information elements of interest is identified by an index associated with one of said plurality of program objects.

69. The NMS of claim 68, wherein the instances of interest for said information elements of interest are identified by another index associated with another one of said plurality of program objects.

70. The NMS of claim 69, further comprising:
  means for sending a create and wait command prior to receiving said first command; and
  means for sending an active command after sending said first command.

71. A network element for supporting efficient retrieval of information of interest, said network element comprising:
  a processor implementing a meta MIB, wherein said meta MIB enables specifying information elements of interest from a plurality of base MIBs;
  an input interface receiving a first command specifying a first information element of interest in said network element is to be accessible using said meta MIB, wherein said first information element of interest is contained in one of said plurality of base MIBs, wherein said one of said plurality of base MIBs contains a first plurality of information elements identified respectively by a first plurality of identifiers, wherein said first plurality of information elements contains said first information element and said first plurality of identifiers contains a first identifier identifying said first information element, said first information element being identified by a second identifier in said meta MIB, wherein said first identifier is not equal to said second identifier;
  a memory storing data representing that said first information element of interest has been specified to be accessible using said meta MIB, wherein said input interface receives a second command requesting a data value corresponding to said first information element of interest using said meta MIB, wherein said second command identifies said first information element by said second identifier; and
  an output interface sending a response containing said data value in response to receiving said second command.

72. The network element of claim 71, wherein said meta MIB enables specifying non-contiguous instances of said information element, wherein said input receives a third command specifying that a plurality of non-contiguous instances of said first information element of interest are to be accessible using said meta MIB, wherein said response comprises data values corresponding to said plurality of non-contiguous instances.

73. The network element of claim 71, wherein said meta MIB enables specifying non-contiguous instances of said information element, wherein said input interface receives a third plurality of commands specifying that a plurality of non-contiguous instances of said first information element of interest are to be accessible using said meta MIB, wherein said response comprises data values corresponding to said plurality of non-contiguous instances.

74. The network element of claim 73, wherein said third plurality of commands comprises a fourth command specifying a single instance and a fifth command specifying a range of instances.

75. The network element of claim 71, wherein said input interface receives a first plurality of commands including said first command, wherein each of said first plurality of commands specifies that an information element of interest in a corresponding one of said plurality of base MIBs is accessible using said meta MIB.

76. The network element of claim 75, wherein said memory stores in a data structure data representing said information elements of interest, and wherein said processor examines said data structure in response to receiving said second command and interfaces with said network element to retrieve data corresponding to said information elements of interest represented by said data structure, wherein response comprises data retrieved by said processor.

77. The network element of claim 76, wherein said meta MIB comprises a plurality of program objects, wherein each of said information elements of interest is identified by an index associated with one of said plurality of program objects.

78. The network element of claim 77, wherein the instances of interest for said information elements of interest are identified by another index associated with another one of said plurality of program objects.

79. The network element of claim 78, wherein said input interface receives a create and wait command prior to receiving said first command, wherein said create and wait command specifies that an associated instance is to remain inactive, said input interface receiving an active command after receiving said first command, wherein said associated instance is made active in response to said active command, wherein data value related to said associated instance is sent in said response only after said active command is received.

80. The network element of claim 71, wherein said first command comprises a set command and said second command comprises a get command, and wherein said set command and said get command are received according to SNMP.

81. The network element of claim 80, wherein said get command comprises a get bulk request.

82. The network element of claim 81, wherein said get bulk request specifies a sparse object as a parameter and wherein said response comprises a sparse index indicating whether said response contains a valid entry.

83. The network element of claim 71, wherein all of said processor, said input interface, said memory and said output interface are contained in a single physical unit.

* * * * *

UNITED STATES PATENT AND TRADEMARK OFFICE
CERTIFICATE OF CORRECTION

| | | |
|---|---|---|
| PATENT NO. | : 7,302,486 B1 | Page 1 of 1 |
| APPLICATION NO. | : 10/171618 | |
| DATED | : November 27, 2007 | |
| INVENTOR(S) | : Nalinaksh Madhukar Pai | |

It is certified that error appears in the above-identified patent and that said Letters Patent is hereby corrected as shown below:

Insert the following paragraphs at column 1 at line 4, before "BACKGROUND OF THE INVENTION"
-- REFERENCE TO LISTING in APPENDIX
  A listing of the meta-MIBs, which were present respectively as appendix A and B in the filed/prosecuted application, are uploaded herewith using the Private PAIR of the Patent Office. The name and length of the two files are as follows:
   metamib-appendix-A.txt of March 24, 2008, and of length 13KB
   metamib-appendix-B.txt of March 24, 2008, and of length 69KB
The material in the two files is incorporated by reference herein. --

Col. 3; Lines 46-47, replace "if Table" with --ifTable--

Col. 3; Line 54, replace "data to representing" with --data representing--

Col. 6, Line 36, replace "specifies, a program" with --specifies a program--

Col. 17, Line 5, replace "59" with --64--

Col. 12, Line 2, and Col. 14, Line 50, replace "said agent" with --an agent--

Col. 12, Line 56, and Col. 15, Line 34, replace "an agent" with --said agent--

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,302,486 B1 | |
| APPLICATION NO. | : 10/171618 | |
| DATED | : November 27, 2007 | |
| INVENTOR(S) | : Nalinaksh Madhukar Pai | |

It is certified that error appears in the above-identified patent and that said Letters Patent is hereby corrected as shown below:

Title Page insert

--(73) Assignee: Cisco Technology, Inc., San Jose, CA--

Signed and Sealed this

Thirteenth Day of October, 2009

David J. Kappos
*Director of the United States Patent and Trademark Office*